(12) United States Patent
Tsai et al.

(10) Patent No.: US 12,371,561 B2
(45) Date of Patent: Jul. 29, 2025

(54) THERMOPLASTIC VULCANIZATE MATERIAL, ARTICLE FORMED BY THE SAME AND METHOD FOR FORMING THE SAME

(71) Applicant: LCY CHEMICAL CORP., Kaohsiung (TW)

(72) Inventors: Wan-Ting Tsai, Kaohsiung (TW);
Chun-Jui Hsu, Kaohsiung (TW);
Ren-Hao Liu, Kaohsiung (TW);
Yu-Cheng Hsiao, Kaohsiung (TW);
Han-Liou Yi, Kaohsiung (TW)

(73) Assignee: LCY CHEMICAL CORP., Kaohsiung (TW)

( * ) Notice: Subject to any disclaimer, the term of this patent is extended or adjusted under 35 U.S.C. 154(b) by 615 days.

(21) Appl. No.: 17/720,701

(22) Filed: Apr. 14, 2022

(65) Prior Publication Data
US 2022/0332943 A1    Oct. 20, 2022

Related U.S. Application Data

(60) Provisional application No. 63/175,576, filed on Apr. 16, 2021.

(51) Int. Cl.
*C08L 67/03* (2006.01)
*C08L 25/10* (2006.01)

(52) U.S. Cl.
CPC .............. *C08L 67/03* (2013.01); *C08L 25/10* (2013.01); *C08L 2312/02* (2013.01)

(58) Field of Classification Search
USPC .......................................................... 525/64
See application file for complete search history.

(56) References Cited

U.S. PATENT DOCUMENTS

| | | | |
|---|---|---|---|
| 3,037,954 A | 6/1962 | Gessler et al. | |
| 3,806,558 A | 4/1974 | Fischer | |
| 4,104,210 A | 8/1978 | Coran et al. | |
| 4,116,914 A | 9/1978 | Coran et al. | |
| 4,130,535 A | 12/1978 | Coran et al. | |
| 4,141,863 A | 2/1979 | Coran et al. | |
| 4,141,878 A | 2/1979 | Coran et al. | |
| 4,173,556 A | 11/1979 | Coran et al. | |
| 4,207,404 A | 6/1980 | Coran et al. | |
| 4,271,049 A | 6/1981 | Coran et al. | |
| 4,287,324 A | 9/1981 | Coran et al. | |
| 4,288,570 A | 9/1981 | Coran et al. | |
| 4,299,931 A | 11/1981 | Coran et al. | |
| 4,311,628 A | 1/1982 | Abdou-Sabet et al. | |
| 4,338,413 A | 7/1982 | Coran et al. | |
| 5,502,095 A | 3/1996 | Ueshima et al. | |
| 6,020,427 A | 2/2000 | Abraham et al. | |
| 2005/0049349 A1* | 3/2005 | Vortkort | C08L 23/16 524/474 |
| 2020/0283608 A1 | 9/2020 | Chianese | |

FOREIGN PATENT DOCUMENTS

| | | | |
|---|---|---|---|
| CN | 104861587 A | 8/2015 | |
| CN | 105102239 A | 11/2015 | |
| CN | 105524357 B | 12/2017 | |
| CN | 113845736 A | 12/2021 | |
| EP | 922730 A1 * | 6/1999 | .............. C08L 23/08 |
| JP | S575751 A | 1/1982 | |
| JP | H06145477 A | 5/1994 | |
| JP | 2001055491 A | 2/2001 | |
| JP | 3351872 B | 12/2002 | |
| JP | 2006206628 A | 8/2006 | |
| JP | 2008174759 A | 7/2008 | |
| TW | 203079 B | 4/1993 | |
| TW | I635118 B | 9/2018 | |
| WO | 2007037526 A | 4/2007 | |
| WO | 2019063151 A | 4/2019 | |

* cited by examiner

*Primary Examiner* — Terressa Boykin
(74) *Attorney, Agent, or Firm* — BACON & THOMAS, PLLC

(57) ABSTRACT

A thermoplastic vulcanizate material comprises: a continuous phase comprising polyester, wherein a melting point of the polyester is less than or equal to 180° C., a dispersant phase comprising cross-linked rubber, wherein an average particle diameter of the cross-linked rubber is less than or equal to 100 μm.

20 Claims, 4 Drawing Sheets

2 μm

THERMOPLASTIC VULCANIZATE MATERIAL, ARTICLE FORMED BY THE SAME AND METHOD FOR FORMING THE SAME

CROSS REFERENCE TO RELATED APPLICATION

This application claims the benefit of filing date of U.S. Provisional Application Ser. No. 63/175,576, entitled "New type of thermoplastic vulcanizate" filed Apr. 16, 2021 under 35 USC § 119(e)(1).

BACKGROUND

1. Field

The present disclosure relates to a thermoplastic material, an article formed by the same and a method for forming the same. More specifically, the present disclosure relates to a thermoplastic vulcanizate material, an article thrilled by the same and a method for forming the same.

2. Description of Related Art

Currently, under the strategy of the sustainable development goals (SDGs) of the United Nations, various industries are facing the requirements of how to improve the sustainability of products and reduce environmental impact. One solution to achieve the sustainable development goals is to increase the recyclability of wastes generated during the manufacturing process.

Thermoset rubber is applied to various articles such as tires, hoses, belts, gaskets, moldings, shoe outsole, and molded parts. However, the thermoset rubber has the problem of being not recycled and having high carbon footprint.

Therefore, it is desirable to provide a novel material that can replace the thermoset rubber to solve the aforesaid problems.

SUMMARY

The present disclosure provides a thermoplastic rubber composition, comprising: a polyester, wherein a melting point of the polyester is less than or equal to 180° C.; a crosslinkable rubber; and a crosslinking agent.

The present disclosure further provides a thermoplastic vulcanizate material, comprising: a continuous phase comprising polyester, wherein a melting point of the polyester is less than or equal to 180° C.; a dispersant phase comprising cross-linked rubber, wherein an average particle diameter of the cross-linked rubber is less than or equal to 100 μm. The thermoplastic vulcanizate material is made from the aforesaid thermoplastic rubber composition.

The present disclosure further provides a method for forming the aforesaid thermoplastic vulcanizate material, comprising the following steps: providing polyester and crosslinkable rubber (more specifically, a crude rubber), wherein a melting point of the polyester is less than or equal to 180° C.; and performing a dynamic vulcanization process on a mixture comprising the polyester and the crosslinkable rubber with a crosslinking agent to obtain the aforesaid thermoplastic vulcanizate material. The crosslinking agent is used to convert the crosslinkable rubber (more specifically, crude rubber with cross-linking sites) into the cross-linked rubber during the dynamic vulcanization process.

In the present disclosure, the dynamic vulcanization process is performed on the thermoplastic rubber composition comprising polyester, crosslinkable rubber and a cross-linking agent to form the thermoplastic vulcanizate material which is a composite material of polyester and crosslinked rubber. The crosslinking of the crosslinkable rubber is accomplished by dynamic vulcanization. The temperature of the dynamic vulcanization process may be in a range from about 160° C. to 250° C., and the term "about" for the value of the temperature of the dynamic vulcanization process mean within ±20% of the given value. In addition, the time of the dynamic vulcanization process may be in a range from about 1 minute to 40 minutes. In one embodiment of the present disclosure, the time of the dynamic vulcanization process may be in a range from about 2 minutes to 30 minutes. However, the present disclosure is not limited thereto, and the temperature or the time of the dynamic vulcanization process may be adjusted according to the raw materials of the melting point of polyester and the type of cross-linking agent or the desired crosslinking degree of the cross-linked rubber. In one embodiment of the present disclosure, dynamic vulcanization is a process whereby a blend of thermoplastic (for example, polyester), crosslinkable rubber and crosslinking agent is masticated while crosslinking the rubber. The term "dynamic" indicates the blend is subjected to shear forces during the vulcanization step as contrasted with "static" vulcanization wherein the vulcanizable composition is immobile (in fixed relative space) during the vulcanization step. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,049; 4,287,324; 4,288,570; 4,299,931; 4,311,628 and 4,338,413.

In the present disclosure, the method may further comprise a step of: performing a melt blending process on the mixture comprising the polyester and the crosslinkable rubber before the dynamic vulcanization process. Herein, the melt blending process and the dynamic vulcanization process may be performed by different machines or by the same machine according to the need. The temperature of the melt blending process may be in a range from about 120° C. to 200° C. and can be adjusted according to the melting point of the polyester. In addition, the time of the melt blending process is not particularly limited as long as the polyester can be completely melted. In one embodiment of the present disclosure, the melt-blending process means that a fully melted thermoplastic, i.e. polyester, is substantially homogeneously mixed with the crosslinkable rubber at a temperature sufficient to melt the thermoplastic.

In the present disclosure, the equipment for performing the method of the present disclosure is not particularly limited, and can be any processing equipment known in the art, such as a twin-screw extruder, a banbury mixer, a kneader mixer a brabender mixer; but the present disclosure is not limited thereto.

The thermoplastic vulcanizate material of the present disclosure comprises: a continuous phase comprising polyester and a dispersant phase comprising cross-linked rubber, wherein the continuous phase comprising polyester can provide abrasion resistance, and the dispersant phase comprising cross-linked rubber can provide slip resistance.

In the present disclosure, the polyester may be any polyester known in the art, as long as the polyester has a melting point less than or equal to 180° C. When the polyester has a melting point more than 180° C., a cross-linking agent with high initial temperature has to be used, the processing temperature has to be increased to fully melt the polyester, and thereby the polyester and the crude rubber can be uniformly mixed. However, when the processing temperature is too high, the crude rubber may be oxidized and degraded or the oxidative cross-linking may be induced to generate gel, so the rubber may not be uniformly dispersed, which affects the physical properties (for example, tensile strength or elongation) of the obtained thermoplastic vulcanizate material.

The melting point of the polyester used in the present disclosure may be in a range from about, for example, 75° C. to 180° C., 80° C. to 180° C., 85° C. to 183° C., 90° C. to 180° C., 95° C. to 180° C., 100° C. to 180° C., 105° C. to 180° C., 110° C. to 183° C., 115° C. to 180° C., 115° C. to 175° C. or 115° C. to 170° C.; but the present disclosure is not limited thereto.

In one embodiment of the present disclosure, the polyester may have a repeating unit represented by the following formula (I):

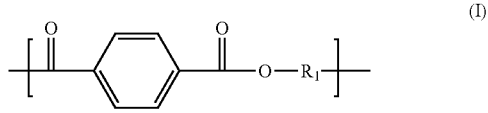

wherein $R_1$ is $-(C_2H_4O)_z-$, $-(C_4H_8O)_z-$, $-(C_6H_{12}O)_z-$

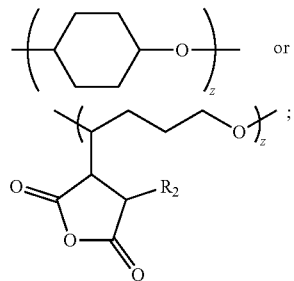

z is an integer of 1 to 25; and $R_2$ is H or a substituent.

In one embodiment of the present disclosure, one repeating unit represented by the formula (I) may be contained in the polyester. In another embodiment of the present disclosure, plural different repeating units represented by the formula (I) may be contained in the polyester. In addition, the polyester may have other repeating units as long as the polyester has the repeating unit represented by the formula (I).

In one embodiment of the present disclosure, z may be an integer of 1 to 25, 1 to 24, 1 to 23, 1 to 22, to 21, 1 to 20, 1 to 19, 1 to 18, 1 to 17, 1 to 16, 1 to 15, 1 to 14, 1 to 13, 1 to 12, to 11 or 1 to 10.

In one embodiment of the present disclosure, the substituent may be halogen, alkyl, alkenyl, alkynyl, alkoxy, cycloalkyl, heterocycloalkyl, aryl or heteroaryl.

In one embodiment of the present disclosure, the polyester may be a co-polyester elastomer (COPE). For example, by introducing other diacids, such as isophthalic acid (IPA), or other dials, such as cyclohexane dimethanol (CHDM) to the polyester polyethylene terephthalate (PET), the material becomes a copolyester clue to its comonomer content; but the present disclosure is not limited thereto. In one embodiment of the present disclosure, the COPE may be at least one selected from the group consisting of: thermoplastic polyester elastomer (TPEE) and polyethylene terephthalate glycol-co-ethylene vinyl acetate (PETE-co-EVA). However, the present disclosure is not limited thereto, and any other polyester with the melting point less than or equal to 180° C. may be used in the present disclosure.

In one embodiment of the present disclosure, the cross-linkable rubber or the cross-linked rubber may comprise a vinyl group, a styrene group or a combination thereof, wherein a content of the vinyl group is in a range from 10 wt % to 90 wt % based on a total weight of the crosslinkable rubber or the cross-linked rubber when the crosslinkable rubber or the cross-linked rubber comprises the vinyl group, and a content of the styrene group is in a range from 0.1 wt % to 70 wt % based on the total weight of the crosslinkable rubber or the cross-linked rubber when the crosslinkable rubber or the cross-linked rubber comprises the styrene group.

In one embodiment of the present disclosure, the cross-linkable rubber or the cross-linked rubber may comprise a vinyl group, and the content of the vinyl group may be in a range from 10 wt % to 90 wt % based on the total weight of the crosslinkable rubber or the cross-linked rubber. In another embodiment of the present disclosure, the content of the vinyl group may be in a range from 25 wt % to 60 wt % based on the total weight of the crosslinkable rubber or the cross-linked rubber to further increase the slip resistance of the thermoplastic vulcanizate material of the present disclosure.

In one embodiment of the present disclosure, the cross-linkable rubber or the cross-linked rubber may comprise a styrene group, and the content of the styrene group may be in a range from 0.1 wt % to 70 wt % based on the total weight of the crosslinkable rubber or the cross-linked rubber.

In one embodiment of the present disclosure, the cross-linkable rubber or the cross-linked rubber may comprise both the vinyl group and the styrene group, wherein the content of the vinyl group may be in a range from 10 wt % to 90 wt % and the content of the styrene group may be in a range from 0.1 wt % to 70 wt % based on the total weight of the crosslinkable rubber or the cross-linked rubber. In another embodiment of the present disclosure, the crosslinkable rubber or the cross-linked rubber may comprise both the vinyl group and the styrene group, Wherein the content of the vinyl group may be in a range from 25 wt % to 60 wt % and the content of the styrene group may be in a range from 0.1 wt % to 70 wt % based on the total weight of the crosslinkable rubber or the cross-linked rubber.

In one embodiment of the present disclosure, the cross-linkable/cross-linked rubber may be at least one selected from the group consisting of crosslinkable/cross-linked styrene-butadiene rubber (SBR), crosslinkable/cross-linked natural rubber (NR), crosslinkable/cross-linked butadiene rubber (BR), crosslinkable/cross-linked nitrile butadiene rubber (NBR, which does not comprise the styrene group) and crosslinkable/cross-linked ethylene vinyl acetate rubber (EVM, which does not comprise the styrene group). However, the present disclosure is not limited thereto, and any other crosslinkable rubber or cross-linked rubber with the aforesaid vinyl group content or styrene group content may be used in the present disclosure.

In one embodiment of the present disclosure, the average particle diameter of the cross-linked rubber may be less than or equal to 100 μm. In another embodiment of the present disclosure, the average particle diameter of the cross-linked rubber may be less than or equal to 30 μm. For example, the average particle diameter of the cross-linker rubber may be in a range from about 0.1 μm to 100 μm, 0.1 μm to 95 μm, 0.1 μm to 90 μm, 0.1 μm to 85 μm, 0.1 μm to 80 μm, 0.1 μm to 75 μm, 0.1 μm to 70 μm, 0.1 μm to 65 μm, 0.1 μm to 60 μm, 0.1 μm to 55 μm, 0.1 μm to 50 μm, 0.1 μm to 45 μm, 0.1 μm to 40 μm, 0.1 μm to 35 μm, 0.1 μm to 30 μm, 0.1 μm to 25 μm, 0.1 μm to 20 μm, 0.1 μm to 15 μm or 0.1 μm to 10 μm; but the present disclosure is not limited thereto.

In one embodiment of the present disclosure, a weight ratio of the polyester to the crosslinkable rubber or the cross-linked rubber may be in a range from about 3:7 to 9:1. In another embodiment of the present disclosure, the weight ratio of the polyester to the crosslinkable rubber or the cross-linked rubber may be in a range from about 4:6 to 6:4. When the weight ratio of the polyester to the crosslinkable rubber is in the aforesaid range, the thermoplastic vulcanizate material comprising the continuous phase comprising polyester and the dispersant phase comprising cross-linked rubber can be obtained after the dynamic vulcanization process.

In one embodiment of the present disclosure, when the processing oil is used in the method for forming the thermoplastic vulcanizate material, the thermoplastic rubber composition or the thermoplastic vulcanizate material may further comprise processing oil, wherein a content of the processing oil is in a range from about 1 wt % to 100 wt % based on a total weight of the crosslinkable rubber or the cross-linked rubber. In another embodiment of the present disclosure, the thermoplastic rubber composition or the thermoplastic vulcanizate material may not comprise processing oil. Herein, the processing oil can decrease the hardness of the cross-linked rubber or the thermoplastic vulcanizate material, or increase the processability of the crosslinkable rubber or the thermoplastic rubber composition.

In one embodiment of the present disclosure, the crosslinking agent may be peroxide, resole type phenolic resin, sulphur, silicon hydride, or other crosslinking agent suitable for crosslinking rubber known in the art. In one embodiment of the present disclosure, the crosslinking agent may be peroxide. In one embodiment of the present disclosure, the crosslinking agent may be 2,5-dimethyl-2,5-bis(tert-butylperoxy)hexane, but the present disclosure is not limited thereto.

In one embodiment of the present disclosure, a co-agent may not be added during the process for forming the thermoplastic vulcanizate material.

In one embodiment of the present disclosure, a co-agent may be used with the crosslinking agent during the dynamic vulcanization process. Thus, the obtained thermoplastic rubber composition may further comprise a co-agent.

In one embodiment of the present disclosure, a sum of the content of the co-agent and the content of the crosslinking agent may be in a range from about 0.1 wt % to 6 wt % based on a total weight of the thermoplastic rubber composition or based on a total weight the mixture comprising the polyester and the crosslinkable rubber and the crosslinking agent to be treated with the dynamic vulcanization process. In another embodiment of the present disclosure, the sum of the content of the co-agent and the content of the crosslinking agent may be in a range from about, for example, 0.1 wt % to 5.8 wt %, 0.1 wt % to 5.6 wt %, 0.1 wt % to 5.4 wt %, 0.1 wt % to 5.2 wt %, 0.1 wt % to 5.0 wt %, 0.1 wt % to 4.8 wt %, 0.1 wt % to 4.6 wt %, 0.1 wt % to 4.5 wt %, 0.1 wt % to 4.4 wt %, 0.1 wt % to 4.2 wt %, 0.1 wt % to 4.0 wt %, 0.1 wt % to 3.8 wt %, 0.1 wt % to 3.6 wt %, 0.1 wt % to 3.5 wt %, 0.1 wt % to 3.3 wt %, 0.1 wt % to 3.0 wt % 0.1 wt % to 2.8 wt %, 0.1 wt % to 2.6 wt %, 0.1 wt % to 2.4 wt %, 0.1 wt % to 2.2 wt %, 0.1 wt % to 2.0 wt %, 0.1 wt % to 1.8 wt %, 0.1 wt % to 1.6 wt %, 0.1 wt % to 1.4 wt %, 0.1 wt % to 1.2 wt %, 0.1 wt % to 1.0 wt % or 0.1 wt % to 0.8 wt %, based on the total weight of the thermoplastic rubber composition or based on a total weight of the mixture comprising the polyester and the crosslinkable rubber and the crosslinking agent to be treated with the dynamic vulcanization process.

In addition, the range of the sum of the contents of the co-agent and the crosslinking agent may be differed according to the amount of the processing oil contained in the thermoplastic rubber composition or the mixture comprising the polyester and the crosslinkable rubber and the crosslinking agent to be treated with the dynamic vulcanization process. The sum of the contents of the co-agent and the crosslinking agent may be decreased as the amount of the processing oil increased. In one embodiment of the present disclosure, the sum of the contents of the co-agent and the crosslinking agent may be in a range from about 0.1 wt % to 6 wt % based on the total weight of the thermoplastic rubber composition or based on a total weight of the mixture comprising the polyester and the crosslinkable rubber and the crosslinking agent to be treated with the dynamic vulcanization process when no processing oil is used. In another embodiment of the present disclosure, the sum of the contents of the co-agent and the crosslinking agent may be in a range from about 0.1 wt % to 5 wt % based on the total weight of the thermoplastic rubber composition or based on a total weight of the mixture comprising the polyester and the crosslinkable rubber and the crosslinking agent to be treated with the dynamic vulcanization process when the amount of the processing oil is 50 wt % based on the total weight of the crosslinkable rubber. In another embodiment of the present disclosure, the sum of the contents of the co-agent and the crosslinking agent may be in a range from about 0.1 wt % to 3.6 wt % based on the total weight of the thermoplastic rubber composition or based on a total weight of the mixture comprising the polyester, the crosslinkable rubber and the crosslinking agent to be treated with the dynamic vulcanization process when the amount of the processing oil is 100 wt % based on the total weight of the crosslinkable rubber. However, the present disclosure is not limited thereto, and the sum of the contents of the co-agent and the crosslinking agent may be differed when the type of the co-agent or the crosslinking agent is changed.

In one embodiment of the present disclosure, the co-agent may be a co-crosslinking agent which may improve the crosslinking rate or the crosslinking degree, and a better cross-linked structure may be obtained by adding suitable amount of the co-crosslinking agent. In another embodiment of the present disclosure, the co-agent may be used as an intermediate of the polyester and the crosslinkable rubber to improve the property of the obtained thermoplastic vulcanizate material. The co-agent may be a compound with at least two functional groups on the molecule. In the present disclosure, examples of the co-agent may include, but are not limited to multifunctional (meth)acrylate (for example, di-functional or tri-functional type multifunctional (meth)acrylate), high vinyl compounds (for example, high vinyl 1,2-polybutadiene), maleimide (for example, bismaleimides such as N,N'-m-phenylenedimaleimide), or multi-functional thiol compounds. In one embodiment of the present disclosure, examples of the co-agent may include, but are not limited to trimethylolpropane triacrylate (TMPTA), trihydroxymethylpropyl trimethylacrylate (TMPTMA), N,N'-m-phenylene dimaleimide (ex: WESTCO™ PDM manufactured by Western Reserve Chemical Corp. or HVA-2 manufactured by DuPont Co.) or 1,2-polybutadiene (ex: RB 830 manufactured by JSR Corp.).

In one embodiment of the present disclosure, the thermoplastic rubber composition or the thermoplastic vulcanizate material may further comprise elastomer selected from the group consisting of hydrogenated styrene block copolymer (HSBC), thermoplastic polyurethane (TPU) and polyolefin elastomer (POE) according to the need. There are various types of HSBC, which mainly comprises styrene-ethylene-ethylene-propylene-styrene copolymer (SEEPS), styrene-ethylene-propylene-styrene copolymer (SEPS) or styrene-ethylene-butylene styrene copolymer (SEBS). There are various types of POE, which mainly comprises polyethylene-based elastomer, propylene-based elastomer (PBE) or olefin block copolymer (OBC).

In one embodiment of the present disclosure, the thermoplastic rubber composition or the mixture of polyester and the crosslinkable rubber may further comprises other auxiliary additives, such as a compatibilizer, an anti-wear agent, an anti-scorch agent, a filler, an anti-oxidant, a wax, a catalyst or a plasticizer, if it is needed.

The present disclosure also provides an article which is made from the aforesaid thermoplastic rubber composition or the thermoplastic vulcanizate material. When the article made by the aforesaid thermoplastic vulcanizate material is no longer used and recycled, the recycled article can be pulverized into powders or small pieces, and a suitable amount of the powders or small pieces can be added into the fresh thermoplastic vulcanizate material to manufacture a new article.

In the present disclosure, the term "halogen" refers to a fluoro, chloro, bronco, or iodo radical.

The term "alkyl" herein refers to a linear or branched hydrocarbon group, containing 1-12 carbon atoms (e.g., $C_1$-$C_{10}$, $C_1$-$C_8$ and $C_1$-$C_6$). Examples include methyl, ethyl, n-propyl, i-propyl, n-butyl, i-butyl, and t-butyl.

The term "alkenyl" herein refers to linear or branched hydrocarbon groups with at least one double bond, and includes, for example, linear or branched $C_{2-12}$ hydrocarbon groups with at least one double bond, linear or branched $C_{2-8}$ hydrocarbon groups with at least one double bond, or linear or branched $C_{2-6}$ hydrocarbon groups with at least one double bond. Examples of the alkenyl include, but are not limited to vinyl, propenyl or butenyl.

The term "alkynyl" herein refers to a linear or branched monovalent or bivalent hydrocarbon containing 2-20 carbon atoms (e.g., $C_2$-$C_{16}$, $C_2$-$C_{12}$, $C_2$-$C_8$, $C_2$-$C_6$ and $C_2$-$C_4$) and one or more triple bonds. Examples of alkynyl include, but are not limited to, ethynyl, ethynylene, 1-propynyl, 1- and 2-butynyl, and 1-methyl-2-butynyl.

The term "alkoxy" refers to an —O-alkyl group. Examples include methoxy, ethoxy, propoxy, and isopropoxy.

The term "cycloalkyl" refers to a saturated and partially unsaturated monocyclic, bicyclic, tricyclic, or tetracyclic hydrocarbon group having 3-12 (e.g., 3-10 and 3-7) carbon atoms. Examples include cyclopropyl, cyclobutyl, cyclopentyl, cyclopentenyl, cyclohexyl, cyclohexenyl, cycloheptyl, and cyclooctyl.

The term "heterocycloalkyl" refers to a nonaromatic 5-8 membered monocyclic, 8-12 membered bicyclic, or 11-14 membered tricyclic ring system having one or more heteroatoms (e.g., O, N, P, and S). Examples include piperazinyl, azepanyl, pyrrolidinyl, dihydrothiadiazolyl, dioxanyl, morpholinyl, and tetrahydrofuranyl.

The term "aryl" refers to a 6-carbon monocyclic, 10-carbon bicyclic, 14-carbon tricyclic aromatic ring system. Examples of aryl groups include phenyl, naphthyl, and anthracenyl.

The term "heteroaryl" refers to an aromatic 5-8 membered monocyclic, 8-12 membered bicyclic, or 11-14 membered tricyclic ring system having one or more heteroatoms (e.g., O, N, P, and S). Examples include thiophenyl, triazolyl, oxazolyl, thiadiazolyl, tetrazolyl, pyrazolyl, pyridyl, furyl, imidazolyl, benzimidazolyl, pyrimidinyl, thienyl, quinolinyl, indolyl, thiazolyl, and benzothiazolyl.

In addition, alkyl, alkenyl, alkynyl, alkoxy, cycloalkyl, heterocycloalkyl, aryl or heteroaryl present in the compounds include both substituted and unsubstituted moieties, unless specified otherwise. Possible substituents may include, but are not limited to, alkyl, cycloalkyl, halogen, alkoxy, alkenyl, heterocycloalkyl, aryl, heteroaryl, ester, amino or carboxyl; but alkyl cannot be substituted with alkyl.

Other novel features of the disclosure will become more apparent from the following detailed description when taken in conjunction with the accompanying drawings.

DETAILED DESCRIPTION OF EMBODIMENT

Figure 1:
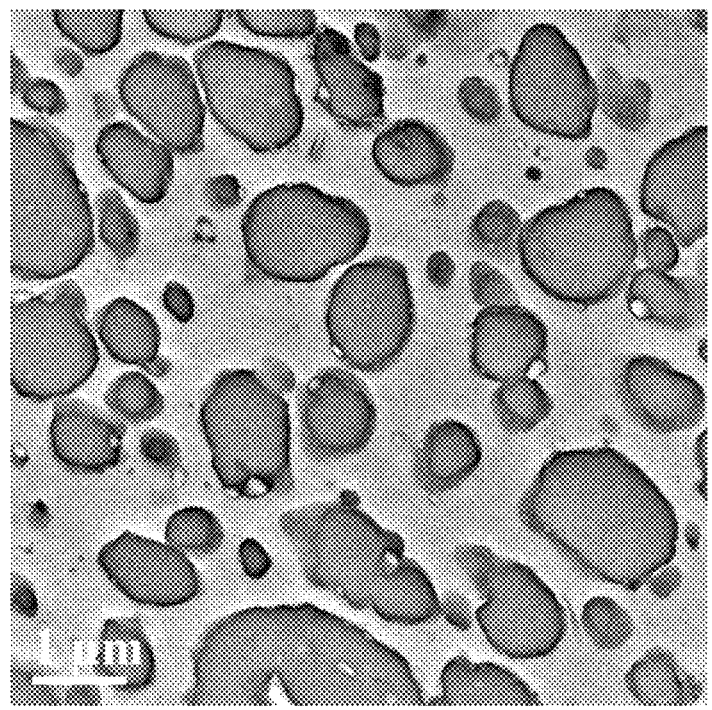
FIG. 1 is a TEM photo of a thermoplastic vulcanizate material prepared in Example 1-7 of the present disclosure.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

In the present disclosure, except otherwise specified, the terms "almost", "about" and "approximately" usually mean the acceptable error in the specified value determined by a skilled person in the art, and the error depends on how the value is measured or determined. In some embodiments, the terms "almost", "about" and "approximately" mean within 1, 2, 3 or 4 standard deviations. In some embodiments, the terms "almost", "about" and "approximately" mean within ±20%, within ±15%, within ±10%, within ±9%, within ±8%, within ±7%, within ±6%, within ±5%, within ±4%, within ±3%, within ±2%, within ±1%, within ±0.5%, within ±0.05% or less of a given value or range. The quantity given here is an approximate quantity, that is, without specifying. "almost", "about" and "approximately", it can still imply "almost", "about" and "approximately". In addition, the terms "in a range from a first value to a second value" and "in a range between a first value and a second value" mean the said range comprises the first value, the second value and other values between the first value and the second value.

In addition, the features in different embodiments of the present disclosure can be mixed to form another embodiment.

Material

A: Rubber
- A-1: ESBR styrene-butadiene rubber), Zeon Corp., NIPOL® 1502
- A-2: SSBR (Solution-polymerized styrene-butadiene rubber), JSR Corp., SL563R
- A-3: IIR (Poly(isobutylene-isoprene), MB Fuller, KALAR® 5246
- A-4: BR (Butadiene rubber), Kumho Petrochemical Co., Ltd, KBR-01
- A-5: NR (Natural rubber), Hoang Dung Co., Ltd, SVR 3L
- A-6: NBR (Acrylonitrile butadiene rubber), Arlanxeo Corp., PERBUNAN® 1846 F
- A-7: EVM (Ethylene vinyl acetate rubber), Arlanxeo Corp., Levapred® 800

B: Plastic
- B-1: TPEE (Thermoplastic polyester elastomer), $T_m$: 145° C., Shinkong Synthetic Fibers Co., 4000-DL
- B-2: PBS (Polybutylene succinate), $T_m$: 115° C.
- B-3: COPE (Co-polyester elastomer), $T_m$: 120° C.
- B-4: COPE, $T_m$: 1.49° C.
- B-5: COPE, $T_m$: 151° C.
- B-6: COPE, $T_m$: 140° C.
- B-7: COPE, $T_m$: 140° C.
- B-8: TPEE, shore A: 45, $T_m$: 150° C., Mitsubishi Chemical Co., TEFABLOC A1400N
- B-9: TPEE, shore A: 61, $T_m$: 150° C., Mitsubishi Chemical Co., TEFABLOC A1500N
- B-10: TPEE, shore A: 67, $T_m$: 160° C., Mitsubishi Chemical Co., TEFABLOC A1606C
- B-11: PETG (Poly(ethylene terephthalate-co-1,4-cyclohexylene dimethylene terephthalate), $T_m$: 260° C., SK Chemicals Co., SKYGREEN® K2012
- B-12: EVA (Ethylene-vinyl acetate copolymers), $T_m$: 84° C., USI Corp., POLYMER-E® EV-103

C: Processing Oil
- C-1: Naphthenic and paraffinic oils, Ergon Inc., HyPrene L2000
- C-2: Naphthenic oils, Eneos Corporation, BUENO GR 500
- C-3: Paraffinic Oil, Michang Oil Ind. Co., Fomi 550

D: Compatibilizer
- D-1: Ethylene-glycidyl metharylate polystyrene copolymer, NOF Corp., MOMPER® A4100
- D-2: Aromatic water-based resin, Mitsui Chemicals Co., FTR™ 6100
- D-3: EAA (Ethylene acrylic acid copolymers), Dow Chemicals Co., PRIMACOR® 5980I E. Peroxide
- E-1: 80% of polypropylene and 20% 2,5-Dimethyl-2,5-bis(tert-butylperoxy)hexane, MannTek Co., Ltd, CR PP-20X F. Co-Agent
- F-1: 75% N, N'-m-phenylene bismaleimide and 25% ethylene propylene terpolymer, Atman Co., Ltd, Atnen PDM-75
- F-2: Syndiotactic-1,2-polybutadiene, JSR Corp., RB-830

G: Anti-Scorch Agent
- G-1: 2,2,6,6-Tetramethylpiperidinooxy, Merck Chemical Co., TEMPO H: Filler
- H-1: Silica, Sibelco Group, Silverbond 925

I: Additive
- I-1: Plasticizer, UPC Group, UN640
- I-2: Tetra isopropyl titanate, catalyst, Borica Co., Ltd., TYTAN-TIPT
- I-3: Lithium Neodecanoate, catalyst, EGE KIMYA Sanayive Ticaret A.S., EGECat® 1D6121

J: Anti-Oxidant
- J-1: Benzeneproanole acid, 3-(1,1-dimethylethyl)-4-hydroxy-5-methyl-2,4,8,10-tetraoxaspiro [5.5]undecane-3,9-diylbis(2,2-dimethyl-2,1-ethanediyl)ester), Chemicals, AO20
- J-2: Bis(2,4-dicumylphenyl)pentaeryythritol diphosphate, Dover Chemical Corporation, S9228
- J-3: Tetrakis(2,4-di-tert-butylphenyl) 4,4'-biphenyl-diphosphonite, Clariant International Ltd, AddWorks LXR 568
- J-4: Tetrakis(2,4-di-tert-butylphenyl) 4,4'-biphenyl-diphosphonite, Clariant International Ltd, VN 125949

K: Wax
- K-1: Polar modified wax, Clariant International Ltd, RBW 102
- K-2: Waxy amide, Kao Chemicals Global, KAO WAX EB-FF
- K-3: Zinc 12-hydroxystearate, Sakai Chemical Industry Co., Ltd, SZ-120H L: Elastomer
- L-1: SEBS (StyTene-ethylene-butylene-styrene), LCY, SEBS 7533
- L-2: HSBC (Hydrogenated styrene block copolymer), Kraton, MD6951
- L-3: TPU (Thermoplastic polyurethane), Okada Engineering Co. Ltd., Gumthane AKX-550
- L-4: PBE (Propylene-based elastomer), ExxonMobil Corp., Vistamaxx 6202

M: Anti-Wear Agent
- M-1: Polyester modified polysiloxane, Evonik Industries AG., TEGOMER H-Si 6441P Processing Method Twin-Screw Extruder The processing method using the twin-screw extruder is known in the art. Briefly, the polyester, the crosslinkable rubber and the additives were added and melted at 180° C., the processing oil was selectively added and mixed at 180° C., and the crosslinking agent (optionally with the co-agent) was added and mixed at 180° C. Then, the dynamic vulcanization process was performed at 190° C., followed by conveying out at 190° C. to obtain the thermoplastic vulcanizate material.

Banbury Mixer

The processing method using the banbury mixer is known in the art. Briefly, the crosslinkable rubber was mixed with the processing oil at 180° C. if it was needed, followed by adding the additives. Then, the polyester and the crosslinking agent (optionally with the co-agent) were sequentially added at 180° C. The dynamic vulcanization process was performed at 180° C. for 20 to 30 minutes to obtain the thermoplastic vulcanizate material.

Testing Method

The Shore A hardness of the obtained thermoplastic vulcanizate material was measured according to ASTM D2240. The dry and wet slip resistance of the obtained thermoplastic vulcanizate material was measured according to SATRA TM144-2011. The microstructures of the obtained thermoplastic vulcanizate material were observed with the transmission electron microscope (TEM) or scanning electron microscope (SEM).

Example 1

The components of the thermoplastic rubber composition, the processing method and the test results of thermoplastic vulcanizate material are shown in the following Tables 1-1 and 1-2.

TABLE 1-1

| Processing method | | Twin-screw extruder | | | | Banbury mixer | | |
| --- | --- | --- | --- | --- | --- | --- | --- | --- |
| Example | | 1-1 | 1-2 | 1-3 | 1-4 | 1-5 | 1-6 | 1-7 |
| Plastic:Rubber | | 3:7 | 4:6 | 5:5 | 7:3 | 4:6 | 6:4 | 7:3 |
| Oil Filling (phr) | | 50 | 50 | 50 | 50 | 50 | 50 | 50 |
| Rubber (wt %) | A-1 | 46 | 39 | 35 | 23 | 39 | 31.4 | 25 |
| Plastic (wt %) | B-1 | 20 | 27 | 35 | 53 | 27 | 48.1 | 58.2 |
| Processing Oil (wt %) | C-1 | 73 | 19.5 | 11.5 | 11.5 | 19.5 | 15.7 | 12.5 |
| Compatibilizer (wt %) | D-1 | — | 3.3 | — | — | 3.3 | — | — |
| Peroxide (wt %) | E-1 | 1.15 | 0.6 | 0.875 | 0.575 | 0.6 | 0.785 | 0.625 |
| Co-agent (wt %) | F-1 | 3.07 | 1.6 | 2.34 | 1.54 | 1.6 | 2.1 | 1.67 |
| | F-2 | — | 1.2 | — | — | 1.2 | — | — |
| Anti-scorch agent (wt %) | G-1 | 0.083 | 0.04 | 0.063 | 0.042 | 0.04 | 0.056 | 0.045 |
| Filler (wt %) | H-1 | 4.197 | 6.66 | 5.672 | 5.533 | 6.66 | 0.759 | 0.86 |
| Anti-oxidant (wt %) | J-1 | 0.1 | 0.1 | 0.1 | 0.1 | 0.1 | 0.1 | 0.1 |
| | J-2 | 0.2 | 0.2 | 0.2 | 0.2 | 0.2 | 0.2 | 0.2 |
| Wax | K-1 | 0.2 | 0.2 | 0.2 | 0.2 | 0.2 | 0.2 | 0.2 |
| | K-2 | 0.6 | 0.6 | 0.6 | 0.6 | 0.6 | 0.6 | 0.6 |
| Anti-wear agent | M-1 | 1.4 | — | 2.45 | 3.71 | — | — | — |
| Shore A hardness | | 45.0 ± 2.2 | 54.8 ± 0.8 | 60.5 ± 0.4 | 72.3 ± 0.9 | 65.0 ± 0.2 | 73.8 ± 0.7 | 75.5 ± 0.7 |
| Dry slip resistance | | 0.81 ± 0.01 | 0.99 ± 0.02 | 0.66 ± 0.01 | 0.58 ± 0.0 | 0.93 ± 0.01 | 0.77 ± 0.01 | 0.74 ± 0.0 |
| Wet slip resistance | | 0.29 ± 0.02 | 0.23 ± 0.0 | 0.27 ± 0.01 | 0.27 ± 0.01 | 0.24 ± 0.0 | 0.38 ± 0.0 | 0.4 ± 0.01 |

Figure 2:
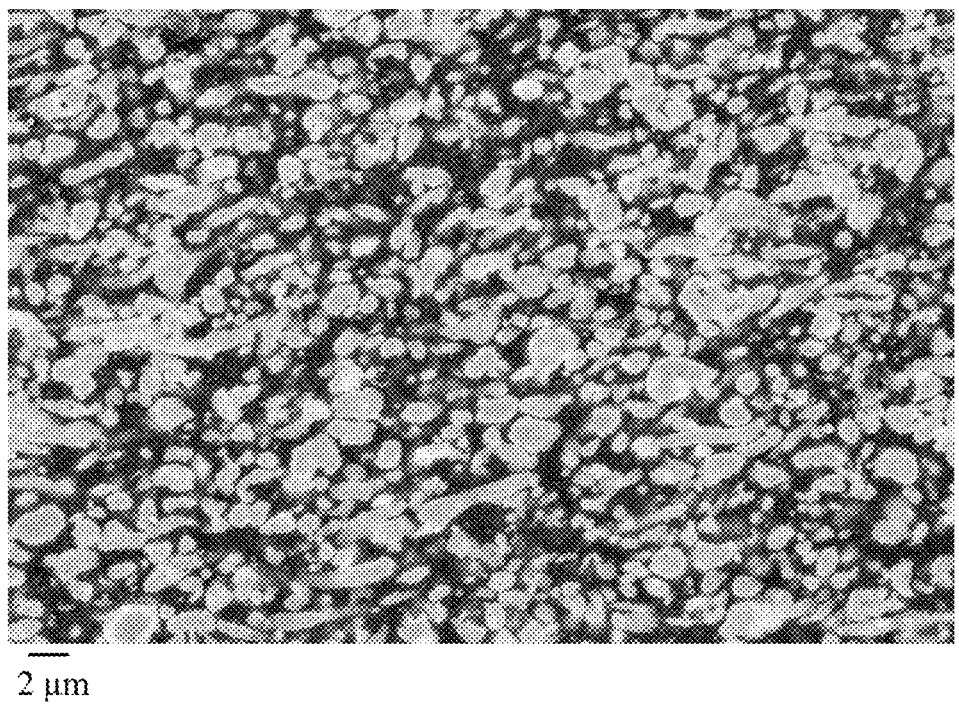
FIG. 2 is a SEM photo of a thermoplastic vulcanizate material prepared in Example 1-7 of the present disclosure.

FIG. 1 is a TEM photo of a thermoplastic vulcanizate material prepared in Example 1-7 of the present disclosure, wherein the black portion is the cross-linked rubber, and the white portion is the polyester. FIG. 2 is a SEM photo of a thermoplastic vulcanizate material prepared in Example 1-7 of the present disclosure, wherein the black portion is the polyester, and the white portion is the cross-linked rubber.

As shown in FIG. 1 and FIG. 2, it can be found that the obtained thermoplastic vulcanizate materials have the structure that the continuous phase is constituted by the polyester, the dispersant phase is constituted by the cross-linked rubber, and the average particle diameter of the cross-linked rubber is less than or equal to 100 μm.

Even not shown in the figure, the TEM or SEM photos of the thermoplastic vulcanizate materials prepared in Examples 1-1 to 1-6 also show that the obtained thermoplastic vulcanizate materials have similar structures shown in FIG. 1 or FIG. 2.

TABLE 1-2

| Processing method | | Banbury mixer | | | | | | |
| --- | --- | --- | --- | --- | --- | --- | --- | --- |
| Example | | 1-8 | 1-9 | 1-10 | 1-11 | 1-12 | 1-13 | 1-14 |
| Plastic:Rubber | | 3:7 | 4:6 | 5:5 | 6:4 | 7:3 | 8:2 | 9:1 |
| Oil filling (phr) | | 50 | 50 | 50 | 50 | 50 | 50 | 50 |
| Rubber (wt %) | A-1 | 49.5 | 44.3 | 38.6 | 32.3 | 25.5 | 17.88 | 9.46 |
| Plastic (wt %) | B-1 | 21.2 | 29.5 | 38.6 | 48.5 | 59.4 | 71.54 | 85.11 |
| Processing Oil (wt %) | C-1 | 24.7 | 22.1 | 19.3 | 16.2 | 12.7 | 8.94 | 4.73 |
| Peroxide (wt %) | E-1 | 1.237 | 1.107 | 0.965 | 0.809 | 0.637 | 0.45 | 0.08 |
| Co-agent (wt %) | F-1 | 3.30 | 2.95 | 2.57 | 2.16 | 1.70 | 1.19 | 0.63 |
| Shore A hardness | | 54.7 ± 0.5 | 61.3 ± 0.5 | 67.2 ± 0.8 | 71 ± 0.8 | 76 ± 0.0 | 82.7 ± 0.2 | 84.5 ± 0.4 |
| Dry slip resistance | | 1.05 ± 0.02 | 0.96 ± 0.01 | 0.89 ± 0.01 | 0.84 ± 0.01 | 0.77 ± 0.0 | 0.73 ± 0.01 | 0.61 ± 0.01 |
| Wet slip resistance | | 0.37 ± 0.02 | 0.35 ± 0.02 | 0.36 ± 0.01 | 0.35 ± 0.01 | 0.36 ± 0.02 | 0.47 ± 0.0 | 0.41 ± 0.01 |
| Cross-linked rubber average particle diameter (μm) | | 0.5~6.0 | 0.5~8.0 | 0.3~4.0 | 0.3~4.0 | 0.2~3.0 | — | — |

Figure 3:
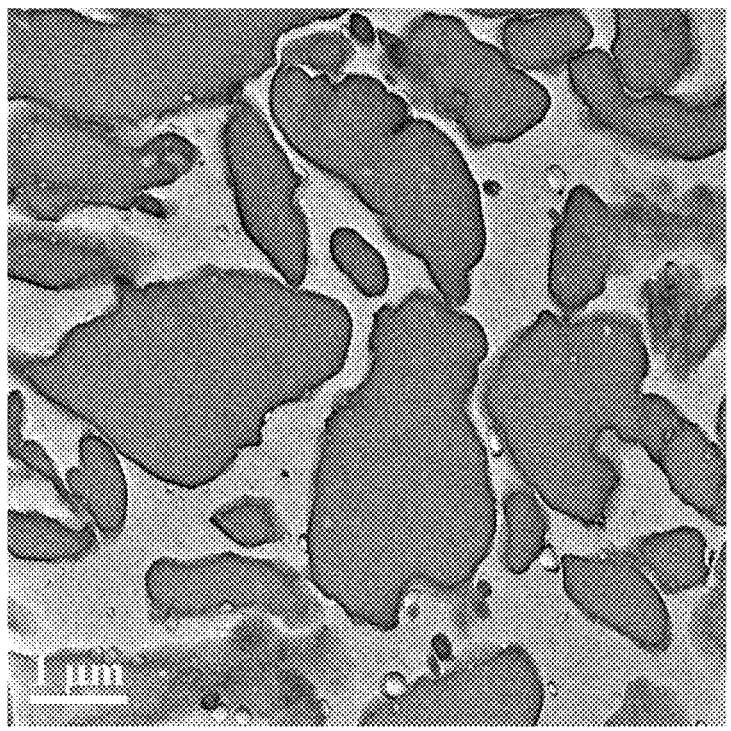
FIG. 3 is a TEM photo of a thermoplastic vulcanizate material prepared in Example 1-10 of the present disclosure.
Figure 4:
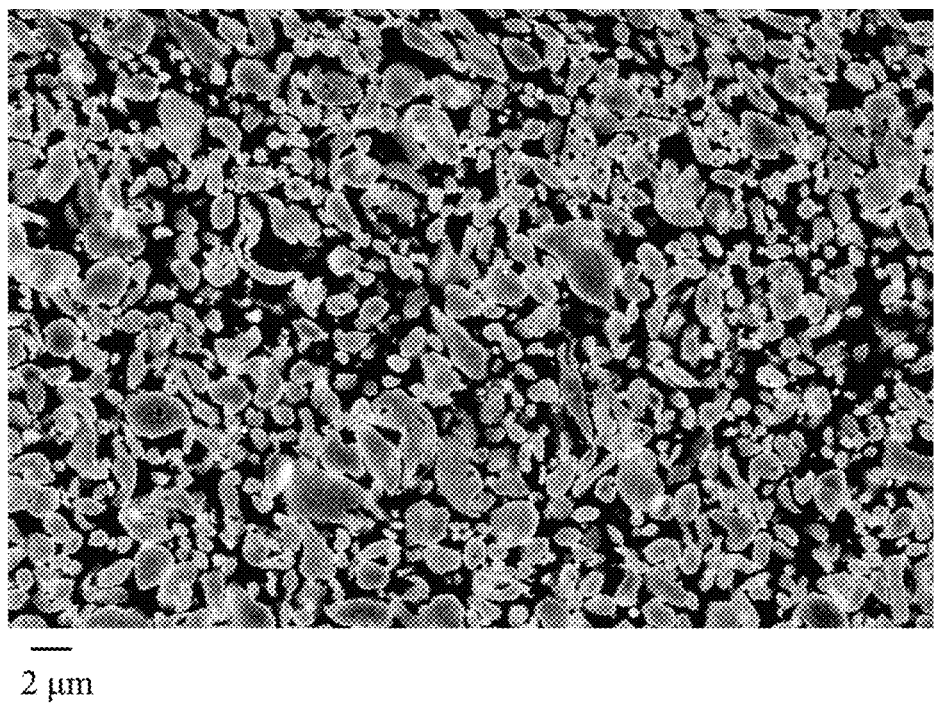
FIG. 4 is a SEM photo of a thermoplastic vulcanizate material prepared in Example 1-10 of the present disclosure.

FIG. 3 is a TEM photo of a thermoplastic vulcanizate material prepared in Example 1-10 of the present disclosure, wherein the black portion is the cross-linked rubber, and the white portion is the polyester. FIG. 4 is a SEM photo of a thermoplastic vulcanizate material prepared in Example 1-10 of the present disclosure, wherein the black portion is the polyester, and the white portion is the cross-linked rubber.

As shown in FIG. 3 and FIG. 4, it can be found that the obtained thermoplastic vulcanizate materials have the structure that the continuous phase is constituted by the polyester, the dispersant phase is constituted by the cross-linked rubber, and the average particle diameter of the cross-linked rubber is about 0.3 μm to 4.0 μm.

Even not shown in the figure, the TEM or SEM photos of the thermoplastic vulcanizate materials prepared in Examples 1-8, 1-9, 1-11 to 1-14 also show that the obtained thermoplastic vulcanizate materials have similar structures shown in FIG. 3 or FIG. 4.

The results of Examples to 114 show that the thermoplastic vulcanizate materials with the desired structure can be obtained when the weight ratio of the polyester to the crosslinkable rubber is in a range from 3:7 to 9:1.

Example 2

The components of the thermoplastic rubber composition, the processing method and the test results of the thermoplastic vulcanizate material are shown in the following Tables 2-1 to 2-3.

TABLE 2-1

| Processing method | | Twin-screw extruder | | | | | | Banbury mixer |
|---|---|---|---|---|---|---|---|---|
| Example | | 2-1 | 2-2 | 2-3 | 2-4 | 2-5 | 2-6 | 2-7 |
| Plastic:Rubber | | 3.5:6.5 | 3.5:6.5 | 3.5:6.5 | 3.5:6.5 | 5:5 | 6:4 | 6:4 |
| Oil filling (phr) | | 80 | 80 | 80 | 80 | 80 | 50 | 50 |
| Rubber (wt %) | A-1 | 39 | 40 | 40 | 40 | 32 | 31 | 31.00 |
| Plastic (wt %) | B-2 | 2 | — | — | — | 32 | — | — |
| | B-3 | — | 21.6 | — | — | — | — | — |
| | B-4 | — | — | 21.6 | — | — | — | — |
| | B-5 | — | — | — | 21.6 | — | — | — |
| | B-6 | — | — | — | — | — | 46 | — |
| | B-7 | — | — | — | — | — | — | 36.80 |
| Processing Oil (wt %) | C-1 | — | — | — | — | 25.6 | 15.5 | 15.50 |
| | C-2 | 31.2 | 32 | 32 | 32 | — | — | — |
| Compatibilizer (wt %) | D-1 | 3 | — | — | — | 3.2 | — | — |
| Peroxide (wt %) | E-1 | 0.98 | 1 | 1 | 1 | 0.8 | 1.55 | 0.78 |
| Co-agent (wt %) | F-1 | 0.52 | 0.54 | 0.54 | 0.54 | 2.14 | 4.14 | 2.080 |
| Anti-scorch agent (wt %) | G-1 | 0.07 | 0.07 | 0.07 | 0.07 | 0.06 | 0.12 | 0.12 |
| Filler (wt %) | H-1 | 3.575 | 4.135 | 4.135 | 4.135 | 3.1 | 0.59 | 3.42 |
| Anti-oxidant (wt %) | J-1 | 0.021 | 0.022 | 0.022 | 0.022 | 0.1 | 0.1 | 0.10 |
| | J-3 | — | — | — | — | 0.2 | — | — |
| | J-2 | — | — | — | — | 0.2 | 0.20 | — |
| | J-4 | 0.032 | 0.033 | 0.033 | 0.033 | — | — | — |
| Wax (wt %) | K-3 | — | — | — | — | 0.2 | — | — |
| | K-1 | 0.2 | 0.2 | 0.2 | 0.2 | — | 0.2 | 0.20 |
| | K-2 | 0.4 | 0.4 | 0.4 | 0.4 | 0.6 | 0.6 | 0.60 |
| Shore A hardness | | — | — | — | — | — | 77 ± 0.4 | 77.3 ± 1.2 |
| Dry slip resistance | | — | — | — | — | — | 0.64 ± 0.01 | 0.66 ± 0.01 |
| Wet slip resistance | | — | — | — | — | — | 0.4 ± 0.01 | 0.39 ± 0.02 |

TABLE 2-2

| Processing method | | Banbury mixer | | | | | | |
|---|---|---|---|---|---|---|---|---|
| Example | | 2-8 | 2-9 | 2-10 | 2-11 | 2-12 | 2-13 | 2-14 |
| Plastic:Rubber | | 7:3 | 7:3 | 7:3 | 7:3 | 7:3 | 7:3 | 7:3 |
| Oil filling (phr) | | 50 | 50 | 50 | 50 | 50 | 50 | 50 |
| Rubber (wt %) | A-1 | 25.00 | 25.00 | 25.00 | — | 22.51 | 25.00 | 25.00 |
| | A-2 | — | — | — | 22.00 | — | — | — |
| | A-3 | — | — | — | 5.50 | — | — | — |
| Plastic (wt %) | B-1 | 58.2 | 29.10 | 29.10 | 51.00 | 50.91 | 40.74 | 29.10 |
| | B-8 | — | 29.10 | — | — | — | — | — |
| | B-9 | — | — | 29.10 | — | 5.66 | 17.46 | — |
| | B-10 | — | — | — | — | — | — | 29.10 |

TABLE 2-2-continued

| Processing method | | Banbury mixer | | | | | | |
|---|---|---|---|---|---|---|---|---|
| Example | | 2-8 | 2-9 | 2-10 | 2-11 | 2-12 | 2-13 | 2-14 |
| Processing Oil (wt %) | C-1 | 12.5 | 12.50 | 12.50 | 15.20 | 11.26 | 12.50 | 12.50 |
| Compatibilizer (wt %) | D-2 | — | — | — | 2.19 | — | — | — |
| Peroxide (wt %) | E-1 | 0.625 | 0.625 | 0.625 | 0.69 | 0.56 | 0.625 | 0.625 |
| Co-agent (wt %) | F-1 | 1.67 | 1.67 | 1.67 | 1.840 | 1.501 | 1.67 | 1.67 |
| Anti scorch agent (wt %) | G-1 | 0.045 | 0.045 | 0.045 | 0.05 | 0.04 | 0.045 | 0.045 |
| Filler (wt%) | H-1 | 0.86 | 0.86 | 0.86 | 0.43 | 0.84 | 0.86 | 0.86 |
| Plasticizer (wt %) | I-1 | — | — | — | — | 5.657 | — | — |
| Anti-oxidant (wt %) | J-1 | 0.1 | 0.10 | 0.10 | 0.10 | 0.10 | 0.10 | 0.10 |
| | J-2 | 0.2 | 0.20 | 0.20 | 0.20 | 0.19 | 0.20 | 0.20 |
| Wax | K-1 | 0.2 | 0.20 | 0.20 | 0.20 | 0.19 | 0.20 | 0.20 |
| | K-2 | 0.6 | 0.60 | 0.60 | 0.60 | 0.58 | 0.60 | 0.60 |
| Shore A hardness | | 75.5 ± 0.7 | 62.3 ± 0.5 | 64.0 ± 0.0 | 72.0 ± 0.0 | 74.7 ± 0.5 | 69.7 ± 0.9 | 68.0 ± 0.0 |
| Dry slip resistance | | 0.74 ± 0.0 | 0.9 ± 0.01 | 0.92 ± 0.02 | 0.82 ± 0.01 | 0.77 ± 0.01 | 0.89 ± 0.01 | 0.83 ± 0.02 |
| Wet slip resistance | | 0.4 ± 0.01 | 0.28 ± 0.01 | 0.27 ± 0.01 | 0.28 ± 0.01 | 0.3 ± 0.02 | 0.29 ± 0.01 | 0.26 ± 0.0 |

TABLE 2-3

| Processing method Example | | Twin-screw extruder | | |
|---|---|---|---|---|
| | | Comparative example 2-1 | 2-15 | 2-16 |
| Plastic:Rubber | | 3.3:6.7 | 4:6 | 4:6 |
| Oil filling (phr) | | 50 | 50 | 51 |
| Rubber (wt %) | A-1 | 42 | 40 | 40 |
| Plastic (wt %) | B-11 | 21 | 22.4 | 22.4 |
| | B-12 | — | 5.6 | 5.60 |
| Processing Oil (wt %) | C-3 | 21 | 20 | 20.57 |
| Compatibilizer (wt %) | D-3 | 3.2 | — | — |
| Peroxide (wt %) | E-1 | 0.65 | 0.65 | 0.65 |
| Co-agent (wt %) | F-2 | 1.3 | 1.30 | 1.3 |
| | F-1 | 1.75 | 1.75 | 1.75 |
| Anti-scorch agent (wt %) | G-1 | 0.05 | 0.05 | 0.05 |
| Filler (wt %) | H-1 | 8.25 | 7.44 | 6.85 |
| Catalyst (wt %) | I-2 | — | 0.01 | — |
| | I-3 | — | — | 0.03 |
| Wax | K-2 | 0.8 | 0.8 | 0.8 |

Even not shown in the figure, the TEM or SEM photos of the thermoplastic vulcanizate materials prepared in Examples 2-1 to 2-16 show that the obtained thermoplastic vulcanizate materials have the structure that the continuous phase is constituted by the polyester, the dispersant phase is constituted by the cross-linked rubber, and the average particle diameter of the cross-linked rubber is less than or equal to 100 μm.

In addition, in Examples 2-15 to 2-16, PETG-co-EVA with the melting point of 81° C. was formed, and the obtained thermoplastic vulcanizate materials have the structure that the continuous phase is constituted by the polyester, and the dispersant phase is constituted by the cross-linked rubber. However, in Comparative example 2-1, PETG with the melting point of 260° C. was used, and the obtained thermoplastic materials have the structure that the dispersant phase is constituted by the polyester, and the continuous phase is constituted by the cross-linked rubber. Thus, the structure obtained in Examples 2-15 to 2-16 cannot be obtained in Comparative example 2-1.

The results of Examples 2-1 to 2-16 show that the thermoplastic vulcanizate materials with the desired structure can be obtained when the polyester has the melting point less than or equal to 180° C.

Example 3

The components of the thermoplastic rubber composition, the processing method and the test results of the thermoplastic vulcanizate material are shown in the following Tables 3-1 and 3-2.

TABLE 3-1

| Processing method | | Banbury mixer | | | | | |
|---|---|---|---|---|---|---|---|
| Example | | 3-1 | 3-2 | 3-3 | 3-4 | 3-5 | 3-6 |
| Plastic:Rubber | | 7:3 | 7:3 | 7:3 | 7:3 | 5.5:4.5 | 7:3 |
| Oil tilling (phr) | | 50 | 50 | 50 | 50 | 0 | 50 |
| Rubber (wt %) | A-1 | 25.0 | — | — | — | — | 75.0 |
| | A-2 | — | — | — | 25.0 | — | — |
| | A-4 | — | 25.0 | — | — | — | — |
| | A-5 | — | — | 25.0 | — | — | — |
| | A-6 | — | — | — | — | 39.0 | — |
| | A-7 | — | — | — | — | — | 5.8 |
| Plastic (wt %) | B-1 | 58.2 | 58.2 | 58.2 | 58.20 | 46.5 | 52.4 |
| Processing Oil (wt %) | C-1 | 12.5 | 12.5 | 12.5 | 12.50 | — | 12.5 |

TABLE 3-1-continued

| Processing method | | Banbury mixer | | | | | |
|---|---|---|---|---|---|---|---|
| Example | | 3-1 | 3-2 | 3-3 | 3-4 | 3-5 | 3-6 |
| Compatibilizer (wt %) | D-1 | — | — | — | — | 3.3 | — |
| Peroxide (wt %) | E-1 | 0.625 | 0.625 | 0.625 | 0.625 | 0.6 | 0.63 |
| Co-agent (wt %) | F-1 | 1.67 | 1.67 | 1.67 | 1.67 | 1.6 | 1.67 |
| | F-2 | — | — | — | — | 1.2 | — |
| Anti-scorch anent (wt %) | G-1 | 0.045 | 0.045 | 0.045 | 0.045 | 0.04 | 0.05 |
| Filler (wt %) | H-1 | 0.86 | 0.86 | 0.86 | 0.86 | 6.66 | 0.86 |
| Anti-oxidant (wt %) | J-1 | 0.1 | 0.1 | 0.1 | 0.10 | 0.1 | 0.10 |
| | J-2 | 0.2 | 0.2 | 0.2 | 0.20 | 0.2 | 0.20 |
| Wax | K-1 | 0.2 | 0.2 | 0.2 | 0.20 | 0.2 | 0.20 |
| | K-2 | 0.6 | 0.6 | 0.6 | 0.60 | 0.6 | 0.60 |
| Shore A hardness | | 76.3 ± 0.5 | 79.3 ± 0.5 | 78.3 ± 0.5 | 74.8 ± 0.2 | 81.3 ± 0.5 | 77 ± 0.0 |
| Dry slip resistance | | 0.78 ± 0.02 | 0.5 ± 0.01 | 0.73 ± 0.02 | 0.84 ± 0.0 | 0.77 ± 0.01 | 0.8 ± 0.01 |
| Wet slip resistance | | 0.33 ± 0.02 | 0.31 ± 0.02 | 0.23 ± 0.02 | 0.28 ± 0.0 | 0.24 ± 0.02 | 0.28 ± 0.02 |

TABLE 3-2

| Processing method | | Banbury mixer | | | | |
|---|---|---|---|---|---|---|
| Example | | 3-7 | 3-8 | 3-9 | 3-10 | 3-11 |
| Plastic:Rubber | | 7:3 | 7:3 | 7:3 | 7:3 | 7:3 |
| Oil filling (phr) | | 50 | 50 | 50 | 50 | 50 |
| Rubber and Elastomer (wt %) | A-1 | 25.0 | 25.0 | 25.0 | 75.0 | 25.0 |
| | L-1 | 8.3 | 16.6 | — | — | — |
| | L-2 | — | — | 16.6 | — | — |
| | L-3 | — | — | — | — | 17.46 |
| | L-4 | — | — | — | 29.10 | — |
| Plastic (wt %) | B-1 | 49.9 | 41.6 | 41.6 | 29.10 | 40.74 |
| Processing Oil (wt %) | C-1 | 12.5 | 12.5 | 12.5 | 12.50 | 2.5 |
| Peroxide (wt %) | E-1 | 0.625 | 0.625 | 0.625 | 0.625 | 0.625 |
| Co-agent (wt %) | F-1 | 1.67 | 1.67 | 1.67 | 1.67 | 1.67 |
| Anti-scorch agent (wt %) | G-1 | 0.045 | — | — | 0.045 | 0.045 |
| Filler (wt %) | H-1 | 0.86 | 0.86 | 0.86 | 0.86 | 0.86 |
| Anti-oxidant (wt %) | J-1 | 0.1 | 0.1 | 0.1 | 0.10 | 0.1 |
| | J-2 | 0.2 | 0.2 | 0.2 | 0.20 | 0.2 |
| Wax | K-1 | 0.2 | 0.2 | 0.2 | 0.20 | 0.2 |
| | K-2 | 0.6 | 0.6 | 0.6 | 0.60 | 0.6 |
| Shore A hardness | | 71.5 ± 0.4 | 68.2 ± 0.2 | 64.2 ± 0.2 | 62.5 ± 1.1 | 69.3 ± 0.9 |
| Dry slip resistance | | 0.82 ± 0.02 | 0.89 ± 0.01 | 0.88 ± 0.02 | 0.92 ± 0.01 | 0.89 ± 0.01 |
| Wet slip resistance | | 0.32 ± 0.02 | 0.78 ± 0.0 | 0.37 ± 0.02 | 0.38 ± 0.0 | 0.3 ± 0.01 |

Even not shown in the figure, the TEM or SEM photos of the thermoplastic vulcanizate materials prepared in Examples 3-1 to 3-12 show that the obtained thermoplastic vulcanizate materials have the structure that the continuous phase is constituted by the polyester, the dispersant phase is constituted by the cross-linked rubber, and the average particle diameter of the cross-linked rubber is less than or equal to 100 μm.

The results of Examples 34 to 3-6 show that the thermoplastic vulcanizate materials with the desired structure can be obtained by using different types of crosslinkable rubber. The results of Examples 3-7 to 3-12 show that the thermoplastic vulcanizate materials with the desired structure can be obtained when elastomer was added.

Example 4

The components of the thermoplastic rubber composition, the processing method and the test results of the thermoplastic vulcanizate material are shown in the following Table 4.

TABLE 4

| Processing method | | Banbury mixer | | | | | | |
|---|---|---|---|---|---|---|---|---|
| Example | | 4-1 | 4-2 | 4-3 | 4-4 | 4-5 | 4-6 | 4-7 |
| Plastic:Rubber | | 3:7 | 3:7 | 3:7 | 4:6 | 5:5 | 6:4 | 7:3 |
| Oil filling (phr) | | 50 | 50 | 50 | 50 | 50 | 50 | 50 |
| Rubber (wt %) | A-1 | 49.5 | 49.91 | 50.84 | 44.3 | 38.6 | 32.3 | 25.5 |
| Plastic (wt %) | B-1 | 21.2 | 21.39 | 21.79 | 29.5 | 38.6 | 48.5 | 59.4 |
| Processing Oil (wt %) | C-1 | 24.7 | 24.9 | 25.42 | 22.1 | 19.3 | 16.2 | 12.7 |
| Peroxide (wt %) | E-1 | 1.237 | 0.42 | 1.27 | 1.107 | 0.965 | 0.809 | 0.637 |
| Co-agent (wt %) | F-1 | 3.3 | 3.33 | 0.68 | 2.95 | 2.57 | 2.16 | 1.7 |
| Peroxide + Co-agent (wt %) | | 4.5 | 3.8 | 2.0 | 4.1 | 3.5 | 3.0 | 2.3 |
| Shore A hardness | | 54.7 ± 0.5 | 55 ± 0.0 | 51 ± 0.0 | 61.3 ± 0.5 | 67.2 ± 0.8 | 71 ± 0.8 | 76 ± 0.0 |
| Dry slip resistance | | 1.05 ± 0.02 | 1.09 ± 0.01 | 0.99 ± 0.01 | 0.96 ± 0.01 | 0.89 ± 0.01 | 0.84 ± 0.01 | 0.77 ± 0.0 |
| Wet slip resistance | | 0.37± 0.02 | 0.58± 0.04 | 0.52± 0.01 | 0.35 ± 0.02 | 0.36 ± 0.01 | 0.35 ± 0.01 | 0.36 ± 0.02 |

| Processing method | | Banbury mixer | | | | | |
|---|---|---|---|---|---|---|---|
| Example | | 4-8 | 4-9 | 4-10 | 4-11 | 4-12 | 4-13 |
| Plastic:Rubber | | 8:2 | 9:1 | 9:1 | 9:1 | 9:1 | 9:1 |
| Oil filling (phr) | | 50 | 50 | 50 | 50 | 50 | 50 |
| Rubber (wt %) | A-1 | 17.88 | 9.46 | 9.44 | 9.24 | 9.49 | 9.38 |
| Plastic (wt % | B-1 | 71.54 | 85.11 | 84.97 | 83.2 | 85.4 | 84.44 |
| Processing Oil (wt %) | C-1 | 8.94 | 4.73 | 4.72 | 4.6'2 | 4.74 | 4.69 |
| Peroxide (wt %) | E-1 | 0.45 | 0.08 | 0.24 | 2.31 | 0.24 | 0.23 |
| Co-agent (wt %) | F-1 | 1.19 | 0.63 | 0.63 | 0.62 | 0.13 | 1.25 |
| Peroxide + Co-agent (wt %) | | 1.6 | 0.7 | 0.9 | 2.9 | 0.4 | 1.5 |
| Shore A hardness | | 82.7 ± 0.2 | 84.5 ± 0.4 | 85.7 ± 0.6 | 83.2 ± 0.8 | 81.8 ± 0.2 | 85 ± 0.4 |
| Dry slip resistance | | 0.73 ± 0.01 | 0.61 ± 0.01 | 0.65 ± 0.01 | 0.62 ± 0.01 | 0.62 ± 00.0 | 0.63 ± 0.0 |
| Wet slip resistance | | 0.47 ± 0.0 | 0.41 ± 0.01 | 0.43 ± 0.0 | 0.44 ± 0.01 | 0.47 ± 0.01 | 0.45 ± 0.01 |

Even not shown in the figure, the TEM or SEM photos of the thermoplastic vulcanizate materials prepared in Examples 4-1 to 4-13 show that the obtained thermoplastic vulcanizate materials have the structure that the continuous phase is constituted by the polyester, the dispersant phase is constituted by the cross-linked rubber, and the average particle diameter of the cross-linked rubber is less than or equal to 100 μm. In addition, the results of Examples 4-1 to 4-13 also show that the sum of the contents of the peroxide and the co-agent less than or equal to 6 wt % based on the total weight of the thermoplastic rubber composition to be treated with the dynamic vulcanization process is a suitable amount for forming the thermoplastic vulcanizate materials of the present disclosure.

Example 5

The components of the thermoplastic rubber composition, the processing method and the test results of the thermoplastic vulcanizate material are shown in the following Table 5.

TABLE 5

| Processing method | | Banbury mixer | | | | |
|---|---|---|---|---|---|---|
| Example | | 5-1 | 5-2 | 5-3 | 5-4 | 5-5 |
| Plastic:Rubber | | 5.5:4.5 | 7:3 | 7:3 | 7:3 | 7:3 |
| Oil filling (phr) | | 0 | 50 | 60 | 80 | 100 |
| Rubber (wt %) | A-1 | 0 | 25 | 24.3 | 23.2 | 22.1 |
| | A-6 | 39.0 | — | — | — | — |
| Plastic (wt %) | B-1 | 46.5 | 58.2 | 56.8 | 54.1 | 51.7 |
| Processing Oil (wt %) | C-1 | — | 12.5 | 14.6 | 18.6 | 22.1 |
| Compatibilizer (wt %) | D-1 | 3.3 | — | — | — | — |
| Peroxide (wt%) | E-1 | 0.6 | 0.625 | 0.61 | 0.58 | 0.55 |
| Co-agent (wt %) | F-1 | 1.6 | 1.67 | 1.62 | 1.55 | 1.48 |
| | F-2 | 1.2 | — | — | — | — |
| Anti-scorch agent (wt %) | G-1 | 0.04 | 0.045 | 0.044 | 0.042 | 0.04 |
| Filler (wt %) | H-1 | 6.66 | 0.86 | 0.86 | 0.86 | 0.86 |
| Anti-oxidant (wt %) | J-1 | 0.1 | 0.1 | 0.1 | 0.1 | 0.1 |
| | J-2 | 0.2 | 0.2 | 0.2 | 0.2 | 0.2 |
| Wax | K-1 | 0.2 | 0.2 | 0.7 | 0.7 | 0.2 |
| | K-2 | 0.6 | 0.6 | 0.6 | 0.6 | 0.6 |
| Shore A hardness | | 81.3 ± 0.5 | 75.5 ± 0.7 | 76 ± 0.0 | 75.2 ± 0.2 | 75.2 ± 0.2 |
| Dry slip resistance | | 0.77 ± 0.01 | 0.74 ± 0.0 | 0.75 ± 0.01 | 0.74 ± 0.01 | 0.68 ± 0.02 |
| Wet slip resistance | | 0.24 ± 0.02 | 0.4 ± 0.01 | 0.34 ± 0.01 | 0.38 ± 0.01 | 0.32 ± 0.01 |

Even not shown in the figure, the TEM or SEM photos of the thermoplastic vulcanizate materials prepared in Examples 5-1 to 5-5 show that the obtained thermoplastic vulcanizate materials have the structure that the continuous phase is constituted by the polyester, the dispersant phase is constituted by the cross-linked rubber, and the average particle diameter of the cross-linked rubber is less than or equal to 100 μm.

The results of Examples 5-1 to 5-5 show that the thermoplastic vulcanizate materials with the desired structure can be obtained whether the processing oil is used or not.

Example 6

The components of the thermoplastic rubber composition, the processing method and the test results of the thermoplastic vulcanizate material are shown in the following Table 6.

TABLE 6

| Processing method | | Banbury mixer | | | | | | |
|---|---|---|---|---|---|---|---|---|
| Example | | 6-1 | 6-2 | 6-3 | 6-4 | 6-5 | 6-6 | 6-7 |
| Plastic:Rubber | | 3:7 | 3:7 | 3:7 | 5:5 | 5:5 | 5:5 | 9:1 |
| Oil filling (phr) | | 50 | 50 | 50 | 0 | 50 | 100 | 0 |
| Rubber (wt %) | A-1 | 49.5 | 49.91 | 50.84 | 47.81 | 38.6 | 32.35 | 9.91 |
| Plastic (wt %) | B-1 | 21.2 | 21.39 | 21.79 | 47.81 | 38.6 | 32.35 | 89.18 |
| Processing Oil (wt %) | C-1 | 24.7 | 24.95 | 75.42 | — | 19.3 | 32.35 | — |
| Peroxide (wt %) | E-1 | 1.237 | 0.42 | 1.27 | 1.2 | 0.965 | 0.81 | 0.25 |
| Co-agent (wt %) | F-1 | 3.3 | 3.33 | 0.68 | 3.19 | 2.57 | 2.16 | 0.66 |
| Peroxide + Co-agent (wt %) | | 4.5 | 3.8 | 2.0 | 4.4 | 3.5 | 3.0 | 0.9 |
| Shore A hardness | | 54.7 ± 0.5 | 55 ± 0.0 | 51 ± 0.0 | 77.2 ± 0.2 | 67.2 ± 0.8 | 55.2 ± 0.2 | 88 ± 0.8 |
| Dry slip | | 1.05 ± | 1.09 ± | 0.99 ± | 0.72 ± | 0.89 ± | 0.87 ± | 0.67 ± |

TABLE 6-continued

| | | | | | | | |
|---|---|---|---|---|---|---|---|
| resistance | 0.02 | 0.01 | 0.01 | 0.02 | 0.01 | 0.01 | 0.02 |
| Wet slip resistance | 0.37 ± 0.02 | 0.58 ± 0.04 | 0.52 ± 0.01 | 0.35 ± 0.01 | 0.36 ± 0.01 | 0.40 ± 0.01 | 0.36 ± 0 |

| Processing method | | Banbury mixer | | | | | |
|---|---|---|---|---|---|---|---|
| Example | | 6-8 | 6-9 | 6-10 | 6-11 | 6-12 | 6-13 |
| Plastic:Rubber | | 9:1 | 9:1 | 9:1 | 9:1 | 9:1 | 9:1 |
| Oil filling (phr) | | 50 | 50 | 50 | 50 | 50 | 100 |
| Rubber (wt %) | A-1 | 9.46 | 9.44 | 9.24 | 9.49 | 9.38 | 9.02 |
| Plastic (wt %) | B-1 | 85.11 | 84.97 | 83.2 | 85.4 | 84.44 | 81.14 |
| Processing Oil (wt %) | C-1 | 4.73 | 4.72 | 4.62 | 4.74 | 4.69 | 9.02 |
| Peroxide (wt %) | E-1 | 0.08 | 0.24 | 2.31 | 0.24 | 0.23 | 0.23 |
| Co-agent (wt %) | F-1 | 0.63 | 0.63 | 0.62 | 0.13 | 1.25 | 0.6 |
| Peroxide + Co-agent wt % | | 0.7 | 0.9 | 2.9 | 0.4 | 1.5 | 0.8 |
| Shore A hardness | | 84.5 ± 0.4 | 85.7 ± 0.6 | 83.2 ± 0.8 | 81.8 ± 0.2 | 85 ± 0.4 | 85.2 ± 0.2 |
| Dry slip resistance | | 0.61 ± 0.01 | 0.65 ± 0.01 | 0.62 ± 0.01 | 0.62 ± 0.0 | 0.63 ± 0.0 | 0.59 ± 0.02 |
| Wet slip resistance | | 0.41 ± 0.01 | 0.43 ± 0.0 | 0.44 ± 0.01 | 0.47 ± 0.01 | 0.45 ± 0.01 | 0.35 ± 0.01 |

Even not shown in the figure, the TEM or SEM photos of the thermoplastic vulcanizate materials prepared in Examples 6-1 to 6-13 show that the obtained thermoplastic vulcanizate materials have the structure that the continuous phase is constituted by the polyester, the dispersant phase is constituted by the cross-linked rubber, and the average particle diameter of the cross-linked rubber is less than or equal to 100 μm.

In addition, the results of Examples 6-1 to 6-13 also show that the sum of the contents of the peroxide and the co-agent less than or equal to 6 wt % based on the total weight of the thermoplastic rubber composition is a suitable amount for forming the thermoplastic vulcanizate materials of the present disclosure.

In conclusion, the present disclosure provides a novel thermoplastic vulcanizate material which has the structure that the continuous phase is constituted by the polyester, the dispersant phase is constituted by the cross-linked rubber, and the average particle diameter of the cross-linked rubber is less than or equal to 100 μm. In addition, the novel thermoplastic rubber composition or thermoplastic vulcanizate material of the present disclosure can be used to manufacture a variety of articles such as tires, hoses, belts, gaskets, moldings, shoe outsoles, and molded parts. Furthermore, when the article made by the thermoplastic vulcanizate material of the present disclosure is no longer used and recycled, the recycled article can be pulverized into powders or small pieces, and a suitable amount of the powders or small pieces can be added into the fresh thermoplastic rubber composition of the present disclosure to manufacture a new article.

Although the present disclosure has been explained in relation to its embodiment, it is to be understood that many other possible modifications and variations can be made without departing from the spirit and scope of the disclosure as hereinafter claimed.

What is claimed is:

1. A thermoplastic vulcanizate material, comprising:
   a continuous phase comprising polyester, wherein a melting point of the polyester is less than or equal to 180° C.; and
   a dispersant phase comprising cross-linked rubber, wherein an average particle diameter of the cross-linked rubber is less than or equal to 100 μm.

2. The thermoplastic vulcanizate material of claim 1, wherein the polyester has a repeating unit represented by the following formula (I):

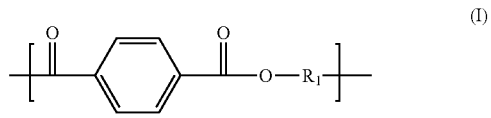

wherein R1 is —(C2H4O)z-, —(C4H8O)z-, —(C6H12O)z-,

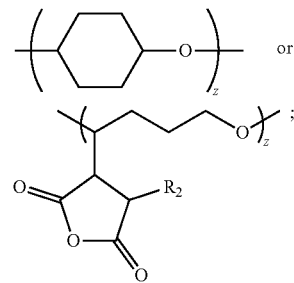

z is an integer of 1 to 25; and R2 is H or a substituent.

3. The thermoplastic vulcanizate material of claim 1, wherein the polyester is co-polyester elastomer (COPE).

4. The thermoplastic vulcanizate material of claim 3, wherein the polyester is at least one selected from the group consisting of: thermoplastic polyester elastomer (TPEE) and polyethylene terephthalate glycol-co-ethylene vinyl acetate (PETG-co-EVA).

5. The thermoplastic vulcanizate material of claim 1, wherein the cross-linked rubber comprises a vinyl group, a styrene group or a combination thereof, a content of the vinyl group is in a range from 10 wt % to 90 wt % based on a total weight of the cross-linked rubber when the crosslinked rubber comprises the vinyl group, and a content of the styrene group is in a range from 0.1 wt % to 70 wt % based on the total weight of the cross-linked rubber when the cross-linked rubber comprises the styrene group.

6. The thermoplastic vulcanizate material of claim 5, wherein the content of the vinyl group is in a range from 25 wt % to 60 wt % based on the total weight of the cross-linked rubber.

7. The thermoplastic vulcanizate material of claim 1, wherein the cross-linked rubber is at least one selected from the group consisting of: cross-linked styrene-butadiene rubber (SBR), cross-linked natural rubber (NR), cross-linked butadiene rubber (BR), cross-linked nitrile butadiene rubber (NBR) and cross-linked ethylene vinyl acetate rubber (EVM).

8. The thermoplastic vulcanizate material of claim 1, wherein a weight ratio of the polyester to the cross-linked rubber is in a range from 3:7 to 9:1.

9. The thermoplastic vulcanizate material of claim 8, wherein a weight ratio of the polyester to the cross-linked rubber is in a range from 4:6 to 6:4.

10. The thermoplastic vulcanizate material of claim 1, further comprising processing oil, wherein a content of the processing oil is in a range from 1 wt % to 100 wt % based on a total weight of the cross-linked rubber.

11. The thermoplastic vulcanizate material of claim 1, further comprising elastomer selected from the group consisting of hydrogenated styrene block copolymer (HSBC), thermoplastic polyurethane (TPU) and polyolefin elastomer (POE).

12. The thermoplastic vulcanizate material of claim 1, wherein the average particle diameter of the cross-linked rubber is less than or equal to 30 μm.

13. An article, which is formed by a thermoplastic vulcanizate material, wherein the thermoplastic vulcanizate material comprises:
   a continuous phase comprising polyester, wherein a melting point of the polyester is less than or equal to 180° C.; and
   a dispersant phase comprising cross-linked rubber, wherein an average particle diameter of the cross-linked rubber is less than or equal to 100 μm.

14. A method for forming a thermoplastic vulcanizate material, comprising the following steps:
   providing polyester and crosslinkable rubber, wherein a melting point of the polyester is less than or equal to 180° C.; and
   performing a dynamic vulcanization process on a mixture comprising the polyester and the crosslinkable rubber with a crosslinking agent to obtain a thermoplastic vulcanizate material, wherein the thermoplastic vulcanizate material comprises: a continuous phase comprising the polyester, wherein a melting point of the polyester is less than or equal to 180° C.; and a dispersant phase comprising a cross-linked rubber, wherein an average particle diameter of the cross-linked rubber is less than or equal to 100 μm.

15. The method of claim 14, further comprising a step of: performing a melt blending process on the mixture comprising the polyester and the crosslinkable rubber before the dynamic vulcanization process.

16. The method of claim 14, wherein the mixture further comprises a co-agent, and a sum of a content of the co-agent and a content of the crosslinking agent is in a range from 0.1 wt % to 6 wt % based on a total weight of the mixture and the crosslinking agent.

17. The method of claim 14, wherein the mixture further comprises a co-agent, and a sum of a content of the co-agent and a content of the crosslinking agent is in a range from 0.1 wt % to 5 wt % based on a total weight of the mixture and the crosslinking agent.

18. The method of claim 14, wherein the mixture further comprises a co-agent, and a sum of a content of the co-agent and a content of the crosslinking agent is in a range from 0.1 wt % to 3.6 wt % based on a total weight of the mixture and the crosslinking agent.

19. The thermoplastic vulcanizate material of claim 1, wherein a melting point of the polyester is selected from the group consisting of: 81° C., 115° C., 120° C., 140° C., 145° C., 149° C., 150° C., 151° C., and 160° C.

20. The thermoplastic vulcanizate material of claim 1, wherein the polyester is melted at 180° C.

* * * * *